United States Patent
Korcz et al.

(10) Patent No.: US 9,300,119 B2
(45) Date of Patent: Mar. 29, 2016

(54) UNIVERSAL MOUNTING BRACKET FOR ELECTRICAL BOXES IN CONCRETE BLOCK WALLS

(71) Applicant: HUBBELL INCORPORATED, Shelton, CT (US)

(72) Inventors: Krzysztof W. Korcz, Grainger, IN (US); Steven J. Johnson, Buchanan, MI (US)

(73) Assignee: Hubbell Incorporated, Shelton, CT (US)

( * ) Notice: Subject to any disclaimer, the term of this patent is extended or adjusted under 35 U.S.C. 154(b) by 141 days.

(21) Appl. No.: 14/265,834

(22) Filed: Apr. 30, 2014

(65) Prior Publication Data

US 2014/0318853 A1    Oct. 30, 2014

Related U.S. Application Data

(60) Provisional application No. 61/817,416, filed on Apr. 30, 2013.

(51) Int. Cl.
| | |
|---|---|
| H02G 3/08 | (2006.01) |
| H02G 3/10 | (2006.01) |
| H02G 3/12 | (2006.01) |

(52) U.S. Cl.
CPC . *H02G 3/08* (2013.01); *H02G 3/121* (2013.01)

(58) Field of Classification Search
CPC ........... H02G 3/08; H02G 3/081; H02G 3/10; H02G 3/12; H02G 3/121; F16M 13/00; F16M 13/02; F16M 2200/00
USPC ........... 174/480, 481, 50, 53, 54, 58, 503, 61; 220/3.2, 3.3, 3.9, 4.02; 248/300, 200, 248/906, 220.21
See application file for complete search history.

(56) References Cited

U.S. PATENT DOCUMENTS

| | | | |
|---|---|---|---|
| 3,268,189 A | 8/1966 | Ducharme | |
| 3,337,168 A | 8/1967 | Albrecht | |
| 3,368,667 A | 2/1968 | Macmillan | |
| 3,674,913 A | 7/1972 | Yates | |
| 3,963,204 A | 6/1976 | Liss | |
| 4,180,226 A | 12/1979 | Matte | |
| 4,362,284 A | 12/1982 | Bolante | |
| 4,447,030 A | 5/1984 | Nattel | |
| 4,693,438 A | 9/1987 | Angell | |
| 4,993,576 A | 2/1991 | Byrne | |
| 5,239,132 A * | 8/1993 | Bartow | H02G 3/12 174/58 |
| 5,810,303 A | 9/1998 | Bourassa et al. | |
| 6,098,939 A * | 8/2000 | He | H02G 3/081 174/58 |
| 6,147,306 A | 11/2000 | Wilkins | |

(Continued)

*Primary Examiner* — Angel R Estrada
(74) *Attorney, Agent, or Firm* — Dickinson Wright PLLC

(57) ABSTRACT

An electrical box support bracket is provided for coupling to the side wall of an electrical box to support the electrical box in an opening formed in a hollow core building block. The support bracket has a flange at the front edge and coupling tab at a front edge that clips onto the side wall of the electrical box. The coupling tab at the front edge of the support bracket has a hook for engaging an inner edge of the electrical box to couple the support bracket to the electrical box and to prevent sliding of the support bracket on the electrical box. A leg extends substantially perpendicular from one end of the body of the bracket to contact the top or bottom surface of the building block during construction of a wall. The flange forms a positioning tab that contacts the front face of the building block to prevent the electrical box from being pushed into the hollow core of the building block until the wall is completed.

20 Claims, 6 Drawing Sheets

(56) References Cited

U.S. PATENT DOCUMENTS

| | | | |
|---|---|---|---|
| 6,389,658 B1 | 5/2002 | Pfaller et al. | |
| 6,578,321 B2 | 6/2003 | Layne | |
| 6,648,277 B2 * | 11/2003 | De Leu | H02G 3/121 174/58 |
| 7,024,833 B1 * | 4/2006 | Rice | E04B 2/8647 52/426 |
| 7,045,713 B1 | 5/2006 | Gretz | |
| 7,082,728 B1 | 8/2006 | McConaughy et al. | |
| 7,381,891 B2 * | 6/2008 | Hull | H02G 3/126 174/50 |
| 7,455,266 B2 | 11/2008 | Faircloth | |
| 7,659,477 B2 * | 2/2010 | Korcz | H02G 3/126 174/50 |
| 7,902,457 B2 * | 3/2011 | Johnson | H02G 3/126 174/57 |
| 8,220,761 B2 | 7/2012 | Brockelsby et al. | |
| 8,912,440 B2 * | 12/2014 | Petak | H02G 3/18 174/58 |
| 2010/0288554 A1 | 11/2010 | Jafari | |
| 2012/0298816 A1 | 11/2012 | Siddiqui et al. | |

\* cited by examiner

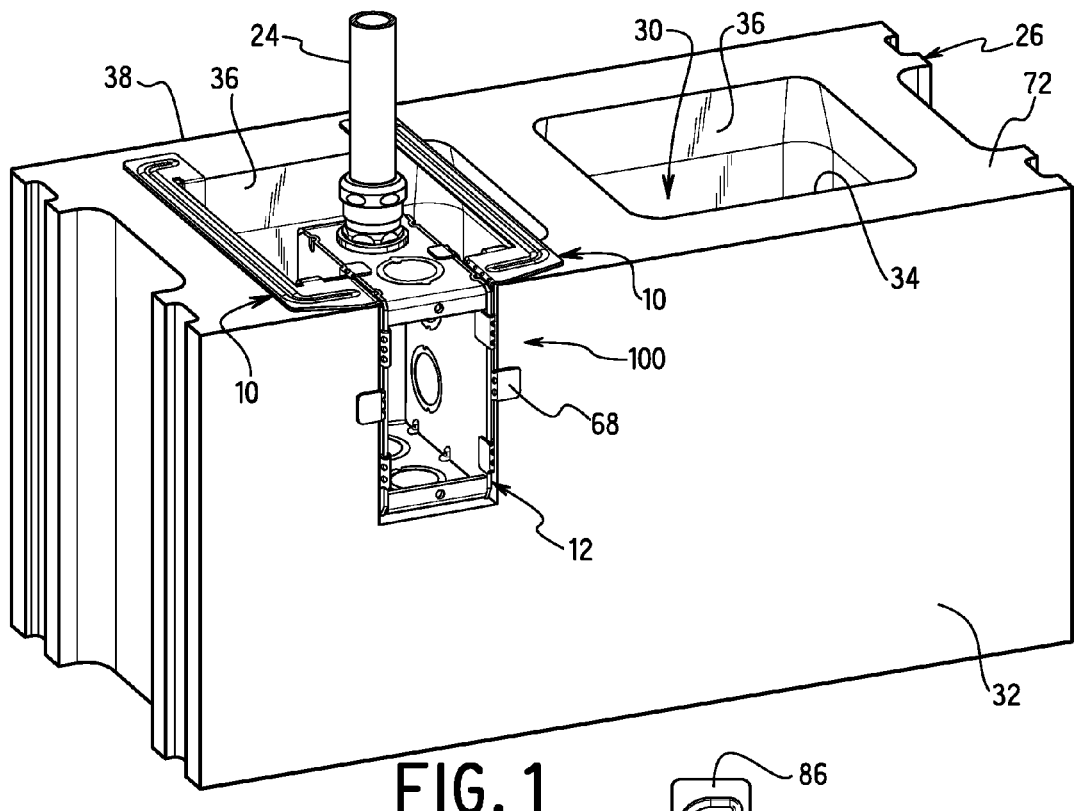
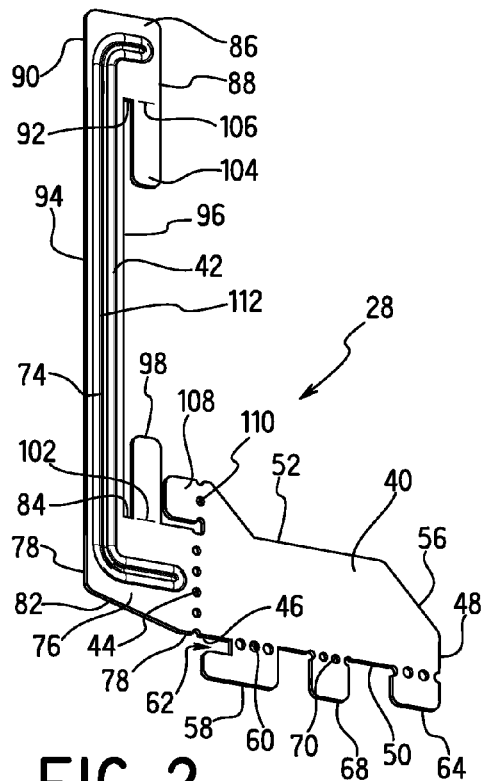
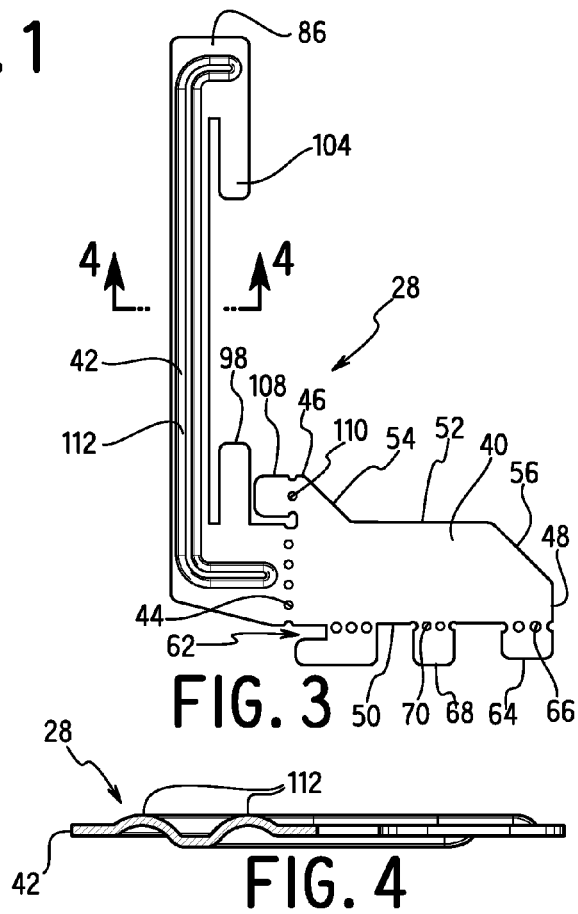
FIG. 1
FIG. 2
FIG. 3
FIG. 4

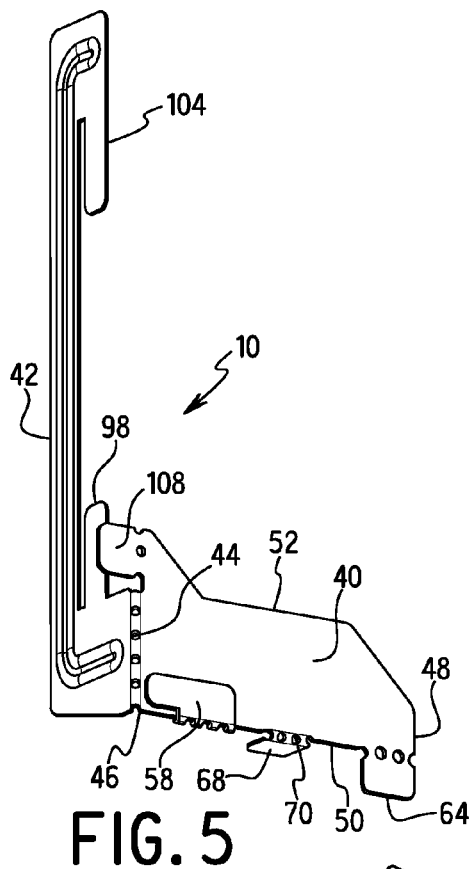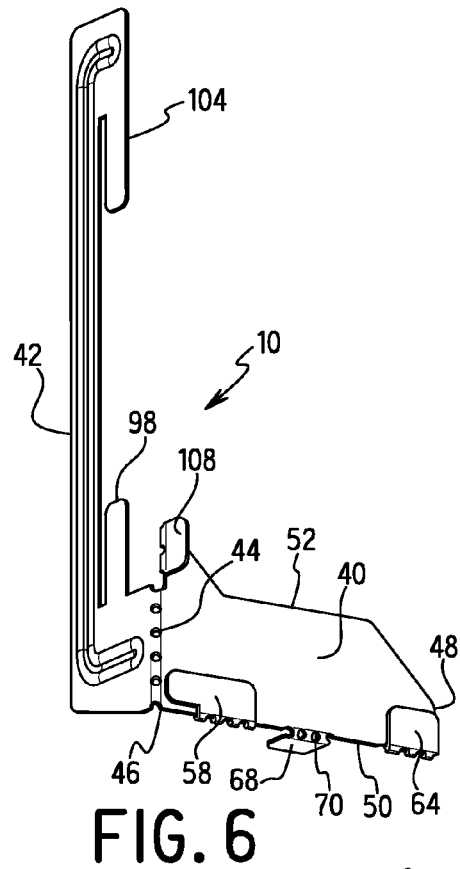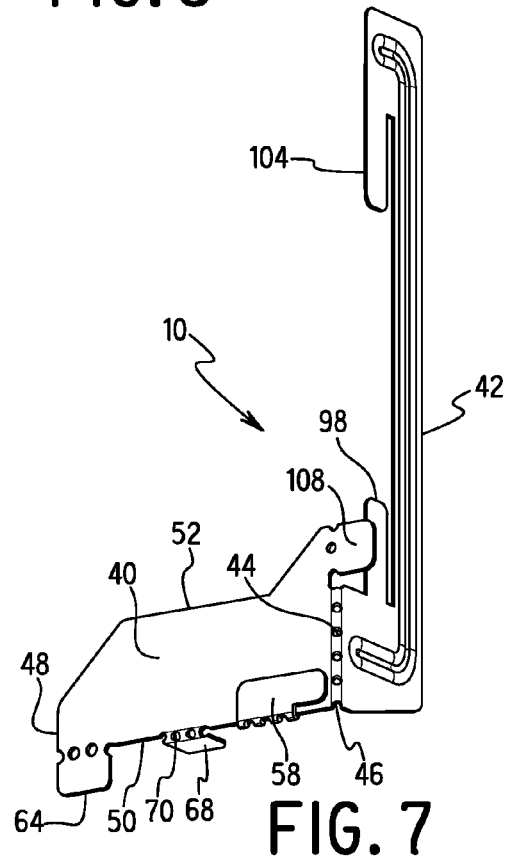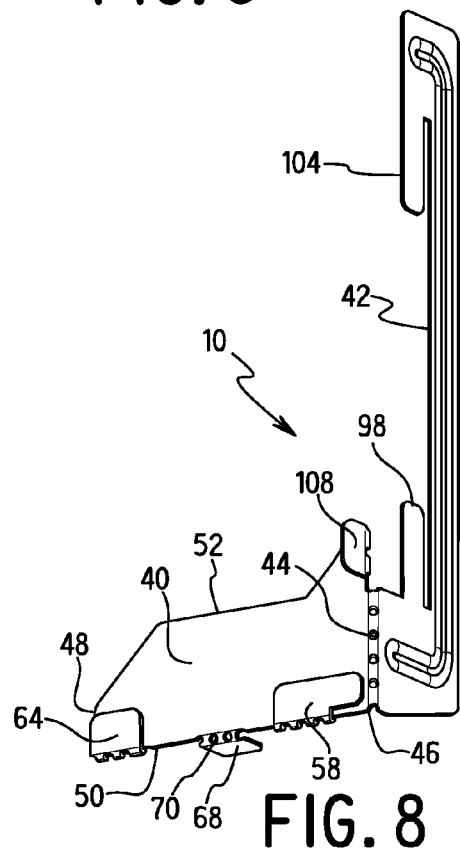

UNIVERSAL MOUNTING BRACKET FOR ELECTRICAL BOXES IN CONCRETE BLOCK WALLS

This application claims priority under 35 USC§119(e) to U.S. Provisional Patent Application Ser. No. 61/817,416 filed Apr. 30, 2013 which is hereby incorporated by reference in its entirety.

FIELD OF THE INVENTION

The present invention is directed to a box mounting support bracket for an electrical box. The invention is particularly directed to an electrical box having a mounting support bracket coupled to an electrical box for supporting and positioning the electrical box in a concrete or building block during construction.

BACKGROUND OF THE INVENTION

During construction of a wall it is desirable to mount an electrical junction box in a manner so that the electrical junction box does not move or shift during construction of the wall and during use after completion of the structure. Numerous mounting devices have been proposed for permanently and/or temporarily mounting electrical boxes in the cavity of a wall during construction.

The standard outlet boxes often require mechanical fasteners to secure the electrical box permanently in place to a wall stud or other support structure. The mechanical fasteners are usually positioned to orient the electrical box in the desired location so that the outer edge of the electrical box is flush with the outer face of the wall.

The mounting of electrical boxes in concrete structures generally requires a different mounting assembly for holding the electrical box in position while the wall is being formed. In addition, concrete wall and building block walls do not enable the usual fasteners that are used in wood walls and studs since nail, screws and other fasteners cannot be easily driven into the wall. Electrical boxes are required to be secured to the wall to prevent movement of the box after installation. Hollow concrete blocks provide a particular difficulty in mounting electrical boxes since there are no surfaces that can readily accommodate fasteners.

Various methods have been proposed for mounting or supporting electrical boxes during construction of the concrete walls and block walls. One manner of mounting the electrical box is to provide a sheet metal form with various tabs that can hold the electrical box in position while the cement or mortar sets. These devices often require the device to be positioned between the joints during the construction of the wall. These devices use the cement or mortar to hold the support in place.

Various devices and methods have been proposed for mounting an electrical box during construction. One example is disclosed in U.S. Pat. No. 2,581,755 to Dieffenderfer which discloses an electrical connection box having a bracket member for mounting to the outer sides of the walls of the box. The brackets are folded to form an outwardly projecting flange and overlap the front side of the wall. Slots are provided for receiving mounting screws to attach the bracket to the box. The bracket has inwardly projecting bendable arms with weakened zones and straps integral with the arms that are folded in a reverse direction. The electrical box and the brackets are inserted into the opening in the wall and the straps are folded outwardly causing the arms to bend and contact the inner surface of the wall.

U.S. Pat. No. 2,736,450 to Atkinson discloses an outlet box securing device. The securing device has a hook portion for contacting the outer edge of the electrical box, a flat portion extending from the hook portion and a spring arm forming a U-shaped loop. The spring arm has one end that contacts the inside surface of the opening to apply a spring force between the side edge of the opening in the wall and the electrical box.

U.S. Pat. No. 3,184,191 to Esoldi discloses an electrical box holder having legs formed in a U-shape for engaging the open end of the electrical box. The center leg of the holder is pulled outwardly with respect to the electrical box causing the body of the holder to bend 90° and contact the inner surface of the wall. The center leg is then folded over the edge of the electrical box.

U.S. Pat. No. 3,337,168 to Albrecht discloses an electrical box support having a pair of outwardly extending legs that are inserted through the opening in the wall to contact the inner surface of the wall. Tabs are then folded over the front edge of the electrical box to secure the electrical box in place.

U.S. Pat. No. 3,362,667 to Ginsberg discloses an electrical switch box support having an outer wall for contacting the outer surface of the wall and an inner wall contacting the inner surface of the wall and forming a channel there between. The body of the support includes tabs that are bent over the open edge of the electrical box to attach the electrical box to the support.

U.S. Pat. No. 4,183,486 to Esoldi discloses an electrical box holder that is inserted into the opening in the wall between the edges of the opening in the side wall of the electrical box. The holder includes a bendable and collapsible center portion and leg extensions on each side of the center portion. The leg extensions extend beyond the front face of the electrical box and the wall and are pulled outwardly causing the center portion to bend and engage the inner surface of the wall.

U.S. Pat. No. 4,693,438 to Angell discloses an electrical box retainer having a U-shaped clip like member having an outwardly extending spring biased flange. The spring biased flange is inserted between the outer edge of the electrical box and the opening in the wall to contact the inner surface of the wall. The main body of the clip is bent over the inner edge of the electrical box.

U.S. Pat. No. 4,669,371 to Sarazen et al. discloses a mounting spring for a foundation vent. The spring clips to the front edge of the vent and has a pair of spring biased legs to contact the inner edge of the opening in the wall.

U.S. Pat. No. 5,494,244 to Walton discloses a similar mounting clip for an air diffuser. The mounting clip has a U-shaped portion that slides onto the inner edge of the opening in the wall and an inwardly extending leg to contact the outer surface of the vent.

U.S. Pat. No. 5,661,264 to Reiker discloses an electrical box having a U-shaped mounting bracket attached to the rear wall of the electrical box. The mounting bracket has outwardly extending legs for supporting the electrical box.

U.S. Pat. No. 6,648,277 to De Leu discloses an electrical box mounting strap for supporting an electrical box within a cavity of the concrete block. The mounting strap has a configuration to conform to the surface of the cavity of the block and has a leg portion to support the rear and side walls of the electrical box to prevent the electrical box from moving inwardly into the cavity of the concrete block.

U.S. Pat. No. 7,455,266 to Faircloth discloses an electrical conduit support for use in a concrete block. The support has a main body portion with a plurality of openings for receiving the conduits and outwardly extending tabs or flanges that contact the upper surface of the concrete block and is captured between the adjacent concrete blocks.

U.S. Pat. No. 8,109,054 to Thomas et al. discloses a fastener for an electrical box within a concrete block. The fastener has a front portion, a center portion and a second portion. The second portion and the center portion of the fastener are inserted through the utility box with part of the second portion extending beyond the back surface of the utility box. The front portion rests across the front surface of the utility box. The second portion is secured against the back surface of the utility box to maintain the position of the utility box within the wall.

While the prior devices are generally suitable for their intended purpose there is a continuing need in the industry for improved methods and devices for mounting electrical boxes during construction of concrete and block walls.

SUMMARY OF THE INVENTION

The present invention is directed to a method and to a device for mounting an electrical box in a wall or other support structure. The invention is particularly directed to a bracket or support for positioning an electrical box in the cavity of a hollow core building block, such as a hollow concrete building block or masonry wall.

Accordingly, an object of the invention is to provide a support bracket for supporting an electrical box in an opening of a building block during construction of a wall or other structure.

Another feature of the invention is to provide a support bracket that can be coupled directly to a standard electrical box and is able to support the electrical box and position the electrical box in an opening in a building block.

The electrical box support bracket of the invention is particularly suitable for mounting and positioning the electrical box in an opening formed in a hollow core building block. The support bracket is able to attach directly to the electrical box and to attach the electrical box to the building block without interfering with the construction of the wall. After completion of the wall or other structure, the mortar used in the construction can be used to fix the electrical box within the opening in the block.

The electrical box support bracket in one embodiment of the invention has a coupling tab that can clip onto a wall of the electrical box to fix the support bracket to the electrical box. The coupling tab can have a projection that can engage a surface of the electrical box to attached the support bracket to the electrical box and prevent movement of the support bracket relative to the electrical box. In other embodiments, the support bracket can be attached to the electrical box by welding.

The electrical box support bracket is a one-piece unitary member formed from sheet steel or other material that is cut and bent to the finished form. The support bracket can be made of other material, such as plastic, that is sufficiently strong and resilient to support the electrical box.

Accordingly, one feature of the invention is to provide a support bracket that is easily assembled with the electrical box and can easily slide and fit into the opening formed in a building block for supporting the electrical box. The support bracket of the invention can be attached to a standard electrical box as known in the art without the need to modify the box.

Another feature of the invention is to provide a universal mounting bracket that can be coupled to different size electrical boxes or to a collar or mud ring attached to an electrical box. The mounting bracket can be folded at the installation site for attaching directly to a right side of an electrical box or to a left side of an electrical box. The mounting bracket is configured for folding the various tabs in different directions according to the intended position of the mounting bracket.

Another feature of the invention is to provide a universal mounting bracket that is manufactured as a substantially flat blank having a plurality of foldable tabs that can be folded in either direction relative to the body of the bracket depending on the intended use and position of the mounting bracket relative to the electrical box. In one embodiment, the foldable tabs can be folded in a first direction for mounting to the right side of an electrical box or folded in a second opposite direction for mounting to a left side of the electrical box.

Another feature of the invention is to provide a mounting bracket configured for coupling to a side of an electrical box and having an outwardly extending leg for contacting the top face or bottom face of a building block for positioning the electrical box in an opening formed in the block during construction of a wall. In one embodiment, the legs can have one or more bendable positioning tabs for contacting the inner surface of a hollow core building block to position the electrical box during construction. A removable positioning tab can be provided for contacting the outer face of the block during construction which can be removed after construction.

The features and objects of the invention are basically attained by providing a mounting bracket for mounting an electrical box in an opening in a hollow core building block. The mounting bracket comprises a body having a first side edge, a second side edge opposite the first side edge, and a first end extending between the first and second side edges, a first coupling tab and a leg. The first coupling tab is coupled to the first side edge by a fold line and is configured for bending over a first edge of the electrical box and for coupling the mounting bracket to the electrical box. The leg has a first end edge, a second end edge, a first side edge and a second side edge extending between the first and second end edges. The first side edge is coupled to the first end edge of the body by a fold line whereby the mounting bracket has a substantially L shape. The leg is bendable in a first direction with respect to the body to a position substantially perpendicular to a plane of the body and is configured for mating with a top or bottom surface of a building block.

The features of the invention are further attained by providing a one piece substantially flat metal blank for forming a mounting clip for mounting an electrical box in an opening of a hollow core building block. The blank comprises a substantially planar body having a first side, a second side opposite the first side, a first end extending between the first side and the second side and a second end opposite the first end and extending between the first side and the second side. A leg is coupled to the first end by a fold line. The leg has a longitudinal dimension greater than a width of the body whereby the blank has a substantially L shape and where the leg is bendable between a first position parallel to the plane of the body and a second position substantially perpendicular to the body. A first coupling tab and a second coupling tab are coupled to the first side of the body by a respective fold line and configured for folding over a side edge of an electrical box to couple the mounting clip to the electrical box.

The various features of the invention are also attained by providing an electrical box assembly for mounting in an opening formed in a hollow core building block comprising an electrical box and a mounting bracket. The electrical box has a first side wall, a second side wall, a first end wall, a second end wall and an open front. The mounting bracket has a body with a first side edge and a first end. A first coupling tab is coupled to the first side edge of the body and is configured for coupling to the first side wall of the electrical box. A leg is coupled to the first end of the body and has a first end, a second end, a first side and a second side where the first side is coupled to the first end of the body by a fold line and is bendable to a position substantially perpendicular to a plane of the body.

These and other objects, advantages and salient features of the invention will become apparent from the following detailed description of the invention which in conjunction with the annexed drawings disclose various embodiments of the invention.

BRIEF DESCRIPTION OF THE DRAWINGS

The following is a brief description of the drawings, in which:

FIG. 1 is a perspective view of the bracket and electrical box assembly during installation in a building block in one embodiment of the invention;

FIG. 2 is a perspective view of the blank for forming the bracket;

FIG. 3 is a front view of the blank of FIG. 2;

FIG. 4 is a cross-sectional view of the blank taken along line 4-4 of FIG. 3;

FIG. 5 is a perspective view of the bracket showing the leg folded in a first direction FIG. 6 is a perspective view of the bracket of FIG. 5 showing the coupling tabs in the bent position;

FIG. 7 is a perspective view showing the leg bent an opposite direction of FIG. 5;

FIG. 8 is a perspective view of the bracket of FIG. 7 showing the coupling tabs and positioning tabs in the bent position;

DESCRIPTION OF THE INVENTION

The invention is directed to a universal mounting bracket and to an electrical box that includes the universal mounting bracket. The mounting bracket of the invention is adapted for supporting the electrical box during construction of a cement or building block wall. The invention is particularly directed to a mounting bracket for positioning an electrical box in a desired location in an opening during construction of a wall.

Figure 15:
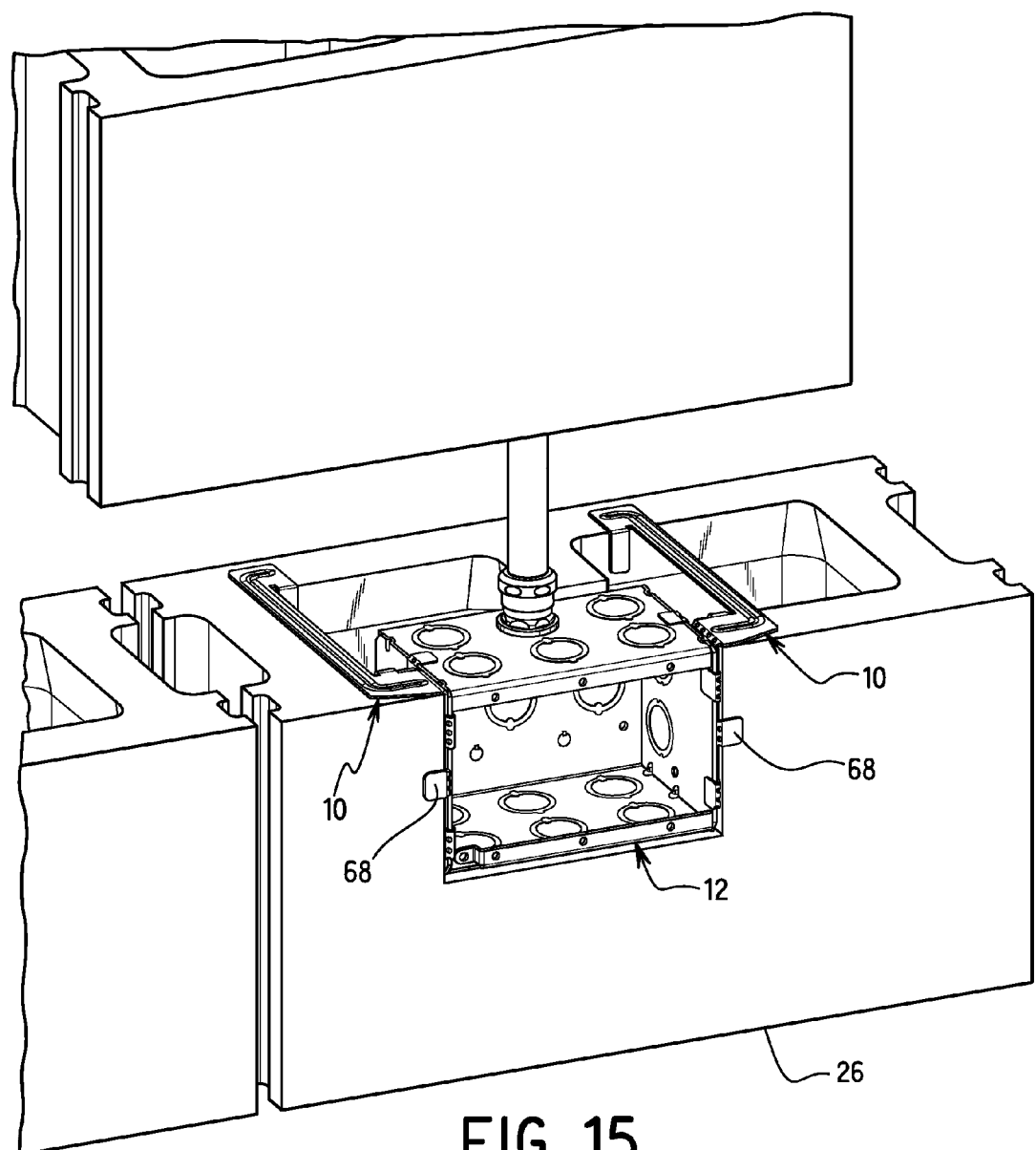
FIG. 15 is a perspective view showing the mounting brackets coupled to a multi gang electrical box.

Referring to the drawings, the invention includes a universal mounting bracket 10 forming an electrical box support that can be attached to an electrical box 12 to form an electrical box assembly 100. The electrical box 12 can be a standard electrical box with standard dimensions and shapes. In the embodiment shown in FIG. 1, the electrical box 12 is a single gang box having a substantially rectangular configuration. In other embodiments, the electrical box can be a multi gang box as shown in the embodiment of FIG. 15.

As shown in FIG. 1, the electrical box 12 has a pair of side walls 14, end walls 16, a back wall and an open front 18 defined by the front edges of the side walls 14 and end walls 16. In the embodiment shown, the electrical box 12 includes a mounting flange 20 extending inwardly from each end wall 16 with a dimension for mounting the electrical device, such as a wall switch or receptacle. In the embodiment shown, the mounting flange 20 extends between the side walls 14 to form a lip projecting into the opening 18 in the electrical box. Each mounting flange 20 includes a screw hole 22 for receiving a mounting screw to attach the electrical device to the box. An electrical conduit 24 can be coupled to the electrical box 12 to supply wires to the electrical box and wiring device as known in the art.

For purposes of illustrating the features of the electrical box and support bracket, the electrical device is not shown. It is to be understood that the electrical device can be any suitable electrical wiring device as known in the art that is commonly mounted to an electrical box.

Referring to the drawings, the universal mounting bracket 10 of the invention is a bracket that can be coupled directly to the wall of the electrical box 12 for mounting and positioning the electrical box on the building block 26 during construction of a wall or other structure.

The mounting bracket 10 is formed from a one piece metal blank 28 that is cut and stamped into the finished form as shown in the FIG. 1 and can be bent to the final shape for attaching to the electrical box 12 and positioning the electrical box to the building block 26 during use.

The building block 26 can be a solid construction or building block for constructing a wall or other building part. The universal mounting bracket 10 of the invention is particularly suitable for use in hollow core building blocks 26 that have one and typically two hollow cavities 30 as known in the art. The building block 26 has a front face 32. The cavity 30 defines a first inner surface 34 opposite the front face 32 and a second inner surface 36 opposite a rear face 38 of the building block 26. The dimensions of the building block 26 are generally conventional size building block.

In one embodiment of the invention, the mounting bracket 10 is produced as the substantially flat blank 28 that can be folded at the time of use by the user for positioning an electrical box 12 during construction of a building block wall. The mounting bracket 10 of the invention in one embodiment is configured for use with the hollow core building block 26. The mounting bracket 10 is able to engage an inner surface of the block to position the electrical box in a selected position relative to the front face 32 of the block 26. The mounting bracket blank 28 is folded to form the mounting bracket 10 and couple the mounting bracket 10 to the electrical box 12 and to contact the inner surfaces 34 and 36 of the building block 26 and positioning the electrical box 12 during construction of the wall or other structure.

The mounting bracket 10 and the blank 28 have a substantially L-shape formed from a single flat piece of bendable metal. The bracket 10 includes a body 40 and a leg 42 forming the L-shape where a first side of the leg 42 is coupled to one end of the body 40. The body 40 and the leg 42 are coupled together by a fold line 44 so that the leg 42 can bend with respect to the body 40 for forming the mounting bracket 10 to the shape shown in FIGS. 1 and 5-8.

The body 40 has a generally a rectangular shape with a first end 46 forming a first transverse edge and an opposite second end 48 forming a second transverse edge. A first longitudinal side 50 forms a third edge extending between the first and second ends 46 and 48, and a second longitudinal side 52 forms a fourth edge opposite the first side 50 and extends between the first and second ends 46 and 48. In the embodiment shown, the second longitudinal side 52 adjacent or next to the first end 46 has an inclined edge portion 54 so that the first end 46 has a width greater than the second end 48. The second longitudinal side 52 has an inclined edge 56 at the second end 48.

A first coupling tab 58 is coupled to the first longitudinal side 50 by a fold line 60. In the embodiment shown the first coupling tab 58 is positioned on the first side 50 at the first end 46. In the embodiment shown, the first coupling tab 58 has a first end 62 aligned with the fold line 44 between the body 40 and the leg 42 and is spaced from the first longitudinal side 50 a distance to form a notch 62. The notch 62 has a width and a length to receive the mounting flange 20 of the electrical box 12.

Figure 9:
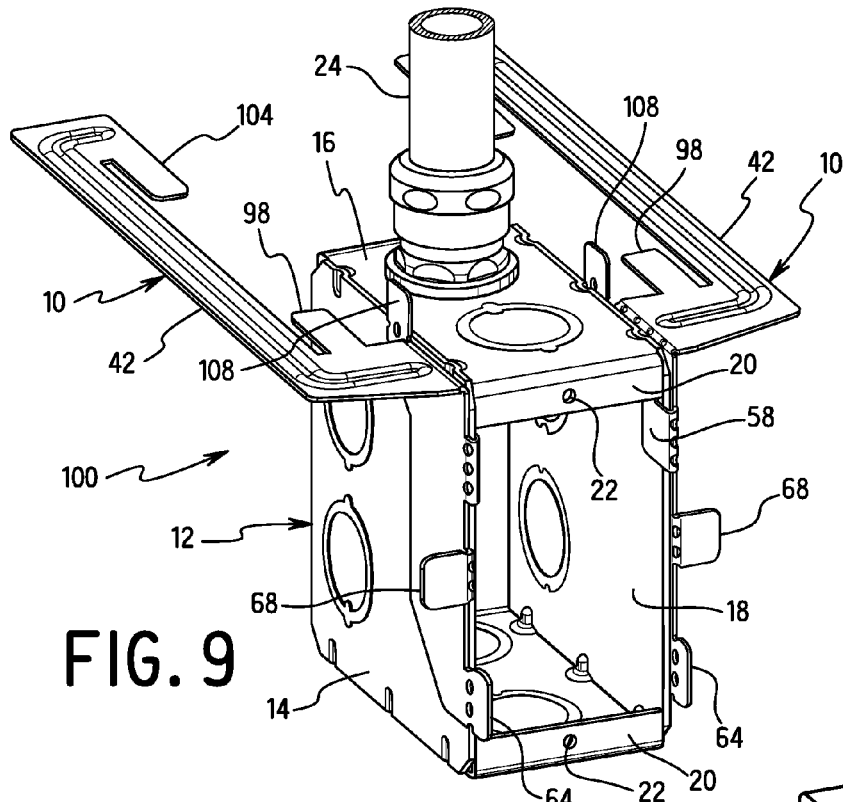
FIG. 9 is a perspective view showing the mounting bracket coupled to the electrical box.
Figure 10:
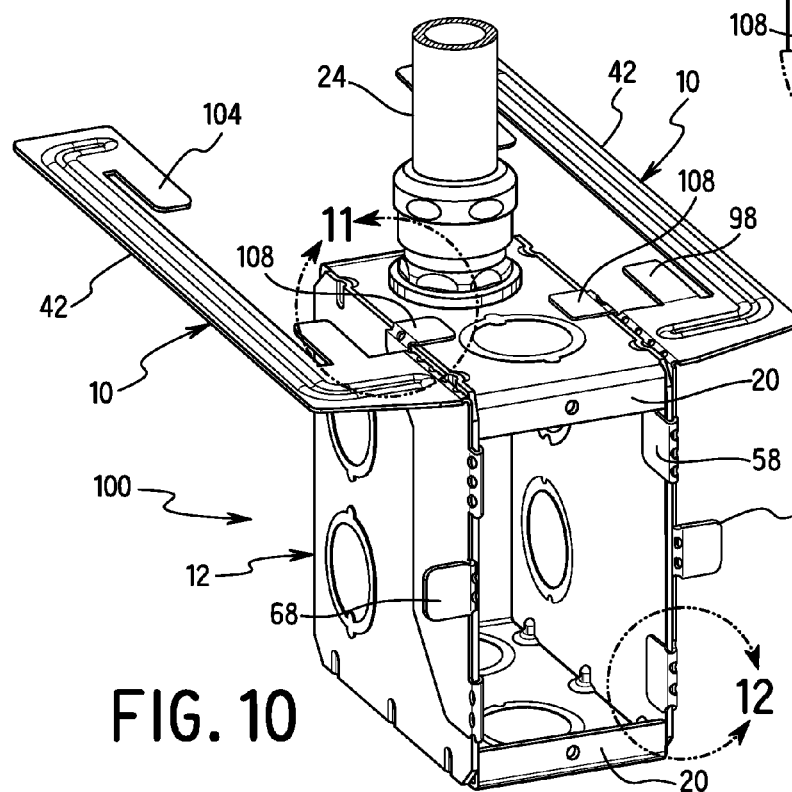
FIG. 10 is a perspective view of the mounting bracket coupled to the electrical box showing the positioning tabs in the bent position.

A second coupling tab 64 is coupled to the first longitudinal side 50 by a fold line 66 at the second end 48. In the embodiment shown, the second coupling tab 64 is spaced from the first coupling tab 58 a distance corresponding substantially to the opening in the electrical box 12. In other embodiments, the coupling tabs 58 and 64 can be positioned at other suitable locations along the length of the longitudinal side 50 for coupling to the electrical box 12. Preferably, the coupling tabs 58 and 64 are spaced apart a distance to effectively grip the side wall of the electrical box 12 as shown in FIGS. 1, 9 and 10.

A positioning tab 68 is coupled to the first longitudinal side 50 by a fold line 70. A positioning tab 68 in the embodiment shown is positioned between the first coupling tab 58 and the second coupling tab 64 at a mid-point along the length of the first side 50. In other embodiments, the positioning tab 68 can be positioned at other locations along the length of the body 40. A positioning tab 68 has a dimension to contact the outer surface of block 26 to position the bracket 10 and the open end of the electrical box 12 at the front edge of the opening in the block 26 as shown in FIG. 1.

Figure 13:
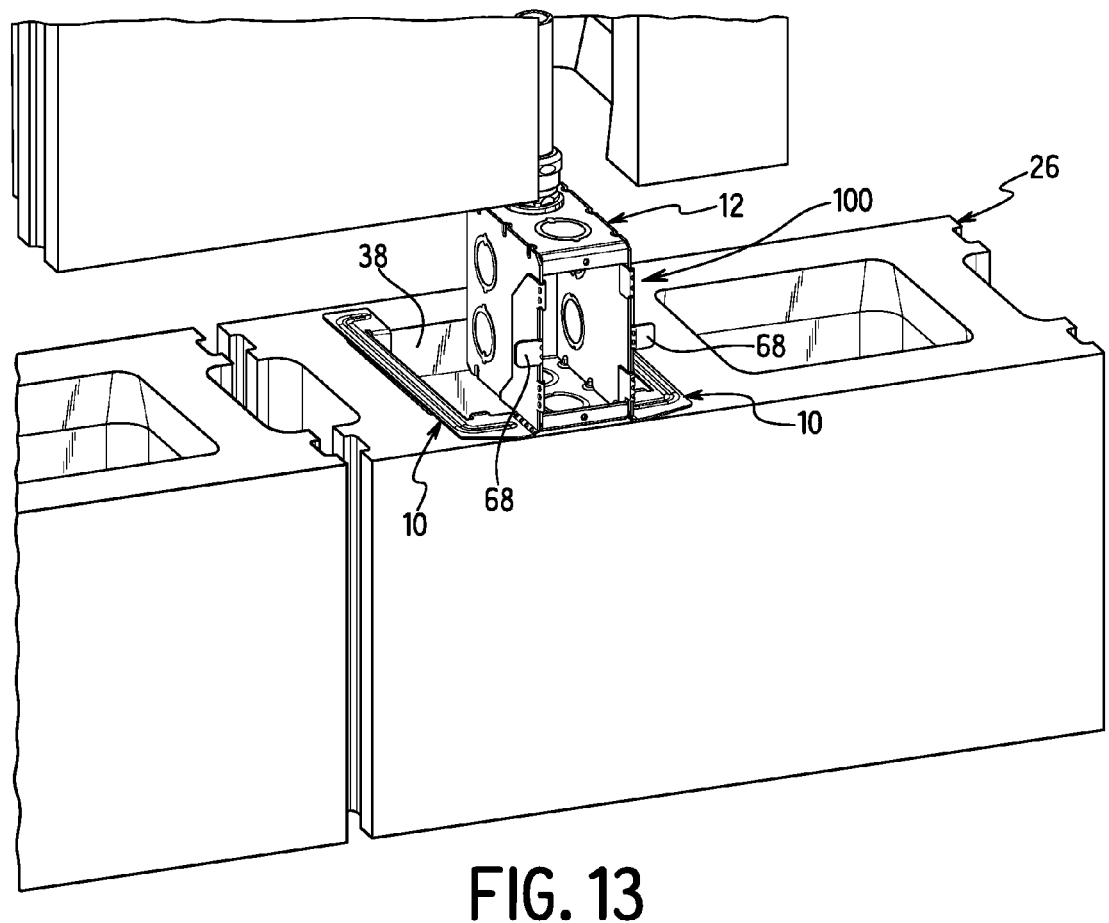
FIG. 13 is a perspective view of another embodiment showing the orientation of the mounting brackets on the electrical box.
Figure 14:
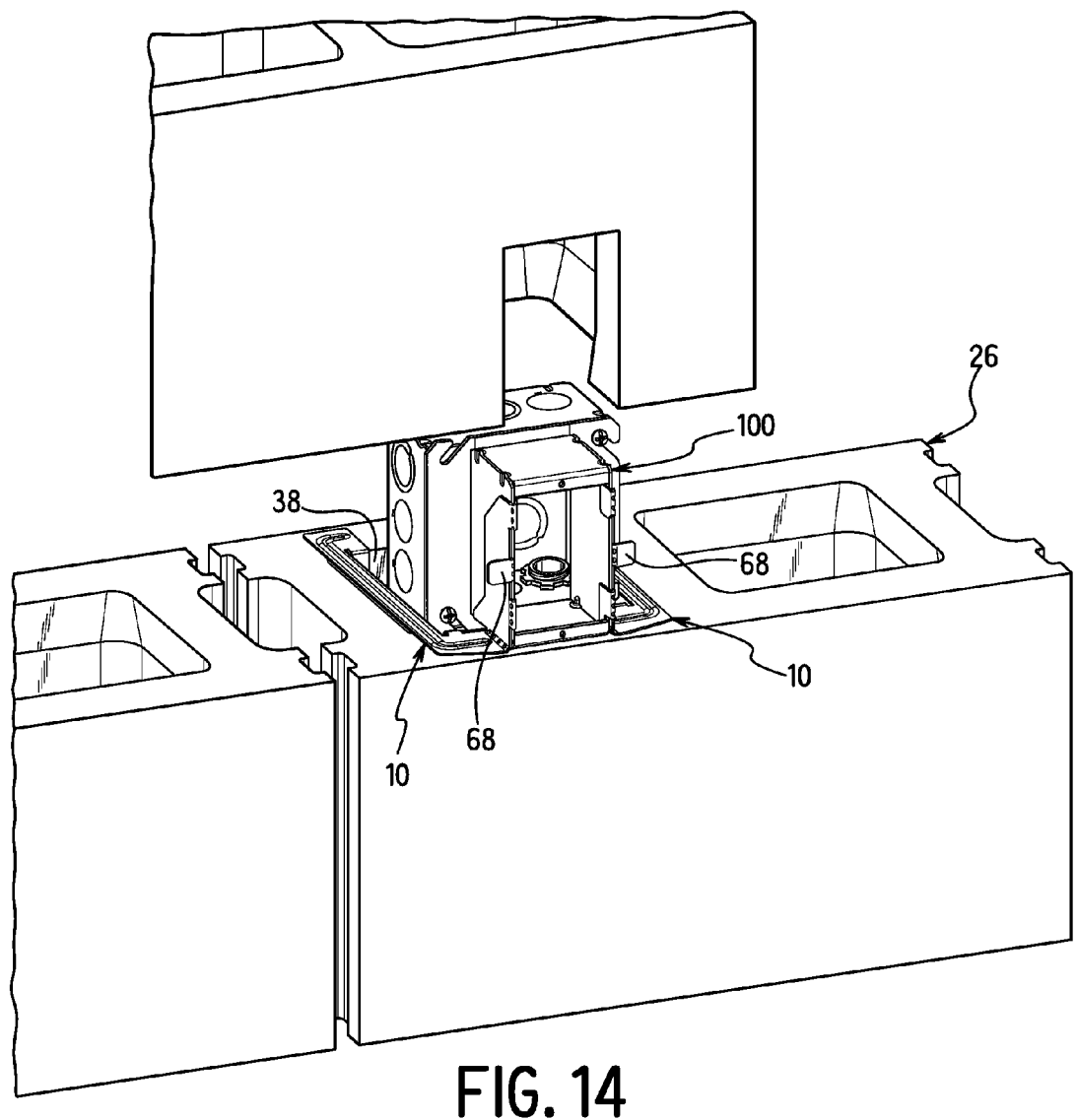
FIG. 14 is a perspective view of a further embodiment showing the mounting brackets coupled to an extension ring on the electrical box.

First coupling tab 58 and second coupling tab 64 can be folded about the respective fold lines 60 and 66 to a position substantially perpendicular to the plane of the body 40. The coupling tabs can be bent in a first direction as shown in FIGS. 5 and 6 for mounting to the left-hand side wall of the electrical box 12. The coupling tabs can also be bent in a second direction shown in FIGS. 7 and 8 for mounting to the right-hand side of the electrical box 12. The blank 28 is formed so that the respective tabs can be bent in a selected direction depending on the intended orientation and position of the bracket 10 with respect to the electrical box 12. In this manner, the blank 28 can be formed into the bracket 10 for mounting on each side of the electrical box 12 as shown in FIG. 1. As shown in FIGS. 1, 9 and 10, the bracket 10 is coupled to the electrical box 12 with the respective legs 42 positioned at the top end of the electrical box 12. The brackets 10 can be inverted so that the legs 42 are positioned at the bottom end of the electrical box 12 as shown in FIGS. 13 and 14.

The leg 42 has a longitudinal dimension for mating with a top surface 72 on the building block 26 for positioning and holding the bracket 10 and electrical box 12 in place during construction of a wall. The leg 42 has a longitudinally extending body 74 with a first end portion 76 having a side edge 78 coupled to the body 40 by the fold line 44. The first end portion 76 has an outer side edge 82 opposite the side edge 78 and an inner edge 84.

The leg 42 has a second end portion 86 spaced from the first end portion 76 by the longitudinal body portion 74. The second end portion 86 has an inner side edge 88 and an outer side edge 90 opposite the inner side edge 88. The second end portion 86 has in inner edge 92 facing the inner edge 84 of the first end portion 76. As shown in FIGS. 2 and 3, the first end portion 76 and the second end portion 86 are oriented substantially perpendicular to the longitudinal dimension of longitudinal body 74 of the leg 42. The longitudinal body 74 has an outer edge 94 facing outwardly with respect to the bracket 10 and an inner edge 96 facing inwardly with respect to the bracket 10 and the body 40.

The inner edge 84 of the first end portion 76 includes a bendable positioning tab 98 have a free end extending toward the second end portion 86 and coupled to the first end portion 76 by a fold line 102. The inner edge 92 of the second end portion 86 has a bendable positioning tab 104 having a free end extending inwardly toward the positioning tab 98 and coupled to the second end portion 86 by a fold line 106. The first end 46 of the body 40 has a bendable positioning tab 108 coupled by a fold line 110 extending substantially perpendicular to the fold lines of the positioning tabs 98 and 104 of the leg 42. As shown in FIGS. 2 and 3, the fold line 110 of the positioning tab 108 is parallel and aligned with the fold line 44 at the first end 46 of the body 40. The longitudinal body 74 has a length complementing dimensions of the building block 26 so that the positioning tabs 98 and 104 are spaced apart a distance to contact the inner surfaces of the block.

As shown in FIG. 1, the leg 42 has a substantially C-shape formed by the longitudinal body 74, the end portions 76 and 86 and the positioning tabs 98 and 104. A reinforcing rib 112 is formed as shown in FIG. 4 in the longitudinal body portion 74 of the leg 42 that can extend into the respective end portions to stiffen and strengthen the leg 42. In the embodiment shown, the first longitudinal end 82 is formed at an inclined angle relative to the first side 50 of the body 40 so that the edge of the leg 42 is recessed with respect to the front edge of the block 26 when installed as shown in FIG. 1.

The bracket 10 of the invention is configured for coupling to an electrical box 12 as shown in the figures. The bracket 10 can be produced as a flat blank that can be folded by the installer when ready for use by folding the tabs along the various fold lines. The blank is folded by bending the leg 42 to a position perpendicular to the body 40 about the fold line 44 to the position shown in FIGS. 5 and 6 for coupling to a first side of the electrical box or to the position shown in FIGS. 7 and 8 for coupling to a second side of the electrical box. The coupling tab 58 is bent to form a reverse by folding along the fold line so that the tab 58 overlies and is parallel to the body 40 as shown in FIGS. 2-8 to extend toward the second side edge 52 forming a substantially U-shaped coupling. In this position, the coupling tab 58 is inserted into the open end of the electrical box 12 so that the mounting flange 20 slides into the notch 62. In this position, the coupling tab 58 engages the inner surface of the mounting flange 20. The coupling tabs 58 and 64 are spaced a distance from the body 12 for fitting onto the wall 14 of the electrical box 12. The second coupling tab 64 is then folded over in the same direction as the first coupling tab 58 as shown in FIGS. 6 and 8 to couple the bracket 10 to the electrical box 12. The positioning tab 68 is bent outwardly perpendicular to the plane of the body 40 as shown in FIGS. 5-8 to contact the outer surface of the block 26. The positioning tab 98 is bent perpendicular to the plane of the body 40 in a direction away from the direction of the leg 42.

Figure 11:
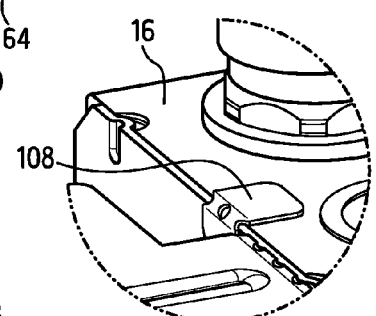
FIG. 11 is an enlarged view showing the positioning tab contacting the end wall of the electrical box.
Figure 12:
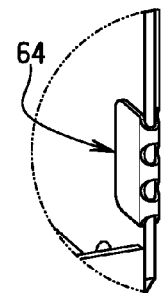
FIG. 12 is an enlarged view showing the coupling tab coupled to the sidewall of the electrical box.

In preferred embodiments, two identical brackets are used for coupling to the electrical box for supporting the opposite sides of the electrical box during installation. Alternatively, a single bracket can be used. The brackets 10 are folded from the blanks into a right hand bracket shown in FIGS. 5 and 6 and a left hand bracket shown in FIGS. 7 and 8 for coupling to opposite sides of the electrical box 12. The side walls 14 of the electrical box 12 fit between the body 12 and the coupling tabs 58 and 64. The coupling tabs are then crimped to secure the bracket 10 to the sides of the electrical box as shown in FIGS. 9, 10 and 12. The positioning tab 68 is folded outwardly opposite the coupling tabs. The positioning tab 98 is folded from the position shown in FIG. 9 to a position to overlie and contact the second wall 16 of the electrical box 12 as shown in FIGS. 10 and 11.

The electrical box 12 and the brackets 10 are positioned in an opening in the block 26 or on a surface of the block as shown with the positioning tabs 68 contacting the outer face 32 of the block 26 to position the front edge of the electrical box 12 in the opening formed in the block 26. The legs 42 of the brackets 10 are positioned on the top face 72 of the block 26 and held in place by another block stacked on the previous block in a conventional construction. The legs 42 are held in place by bending the positioning tabs 104 and 108 downward to engage the inner surfaces 34 and 36 of the block 26 to prevent movement of the bracket 10 and the electrical box 12 during construction of the wall. The mortar used in the construction fixes the bracket 10 and the electrical box 12 in place. After the mortar is set and the electrical box 12 is secured in place, the positioning tabs 68 can optionally be removed by bending until the fold line breaks and the positioning tab can be removed and discarded.

The mounting bracket 10 of the invention is shown in FIGS. 1-12 is used in conjunction with a single gang electrical box where the electrical box is mounted in a vertical orientation with respect to a longitudinal dimension of the electrical box. In other embodiments, the electrical box can be coupled to the mounting brackets to orient the box in a horizontal direction. As shown in FIG. 1 the electrical box 14 and the mounting bracket 10 are mounted in an opening formed in a top edge of the building block 26 so that the legs 42 of the mounting bracket 10 are on the top surface 72 of the block 26 to support and position the electrical box 12 within the opening. In other embodiments, shown in FIGS. 13 and 14, the mounting brackets 10 can be coupled to the electrical box 14 so that the legs are positioned on a bottom end of the electrical box 14. As shown in FIG. 13, the electrical box 14 is positioned on a top edge of the building block 16 and a block having an opening formed for the electrical box is then fitted over the first block and the electrical box to capture the legs and position the electrical box in the block.

The mounting bracket 10 of the invention is suitable for different size and shapes of electrical boxes and is not limited to the single gang box shown in FIGS. 1-12. The mounting brackets 10 can be coupled to the side walls of an extension collar shown in FIG. 14 rather than directly to the electrical box. As shown in FIG. 15, mounting brackets 10 can be used in a multi gang electrical box which can be mounted in a horizontal direction as shown or in a vertical direction.

While various embodiments of the invention have been shown to illustrate the invention, it will be understood that various changes and modifications can be made without departing from the scope of the invention.

What is claimed is:

1. A mounting bracket for mounting an electrical box in an opening in a hollow core building block, said mounting bracket comprising:
   a body having a first side edge, a second side edge opposite said first side edge, and a first end extending between said first and second side edges;
   a first coupling tab coupled to said first side edge by a fold line and configured for bending over the front open edge of the electrical box and coupling said mounting bracket to the electrical box; and
   a leg having a first end, a second end, a first side and a second side extending between said first and second ends, said first side being coupled to said first side edge of said body by a fold line, whereby said mounting bracket has a substantially L-shape, said leg being bendable in a first direction with respect to said body to a position substantially perpendicular to a plane of said body and being configured for mating with a top or bottom surface of the building block.

2. The mounting bracket of claim 1, further comprising a bendable positioning tab coupled to said first end of said body and configured for mating with an outer surface of a second wall of the electrical box that is perpendicular to said first edge of the electrical box.

3. The mounting bracket of claim 1, further comprising
   a positioning tab coupled to said leg at said first end and configured for bending to engage an inner surface of the hollow core building block; and
   a positioning tab coupled to said leg at said second end and configured for bending to engage an inner surface of the building block.

4. The mounting bracket of claim 3, wherein
   said leg has a longitudinal dimension greater than a width of said body,
   said positioning tab coupled to said first end of said leg being bendable about a fold line extending substantially perpendicular to said longitudinal dimension, and
   said tab coupled to said second end of said leg being bendable about a fold line extending substantially perpendicular to said longitudinal dimension.

5. The mounting bracket of claim 2, further comprising
   a positioning tab coupled to said first side edge of said body by a fold line and spaced from said first coupling tab, said positioning tab being configured to bend away from said first coupling tab to contact an outer face of the building block.

6. The mounting bracket of claim 2, wherein
   said first bendable positioning tab is bendable about a fold line and is aligned with the fold line between said leg and said body.

7. A one piece substantially flat metal blank for forming a mounting clip for mounting an electrical box in an opening in a hollow core building block, said blank comprising:
   a substantially planar body having a first side, a second side opposite said first side, a first end extending between said first side and second side, and a second end opposite said first end and extending between said first and second sides;
   a leg coupled to said first end by a fold line, said leg having a longitudinal dimension greater than a width of said body, whereby said blank has a substantially L-shape, and where said leg is bendable between a first position parallel to a plane of said body and a second position substantially perpendicular to said body;
   a first coupling tab and a second coupling tab coupled to said first side of said body by a fold line and configured for folding over a side edge of an electrical box to couple the mounting bracket to the electrical box.

8. The blank of claim 7, wherein
said leg has a first end with a bendable positioning tab coupled to said leg by a fold line parallel to said first side of said body, and a second end opposite said first end and having a bendable positioning tab coupled to said leg by a fold line parallel to said first side of said body.

9. The blank of claim 8, wherein
said positioning tab at said first end of said leg has a free end extending toward said second end of said leg; and
said positioning tab at said second of said leg has a free end extending toward said first end of said leg.

10. The blank of claim 7, further comprising
a positioning tab coupled to said first side by a fold line and being bendable away from said coupling tabs to a position substantially perpendicular to a plane of said body.

11. The blank of claim 7, further comprising
a positioning tab coupled to said first end of said body by a fold line substantially parallel to said fold line between said body and said leg.

12. The blank of claim 11, wherein
said leg has a substantially planar configuration and has a longitudinally extending reinforcing rib formed therein.

13. An electrical box assembly for mounting in an opening formed in a hollow core building block comprising:
an electrical box having a first side wall, a second side wall, a first end wall, a second end wall, and an open front;
a mounting bracket having a body with a first side edge, and a first end edge;
a first coupling tab coupled to said first side edge of said body and being configured for coupling to said first side wall of said electrical box; and
a leg having a first end, a second end, a first side, and a second side, said first side being coupled to said first end of said body by a fold line and being bendable to a position substantially perpendicular to a plane of said body.

14. The electrical box assembly of claim 13, wherein
said first coupling tab is folded over said first side wall of said electrical box to contact an inner surface of said side wall.

15. The electrical box assembly of claim 14, wherein
a second coupling tab is coupled to said first side edge of said body and spaced from said first coupling tab; and
where said first coupling tab has a dimension to contact an inner surface of said first end wall of said electrical box.

16. The electrical box assembly of claim 15, further comprising
a first positioning tab coupled to said first end of said body by a fold line and configured for folding over an outer surface of said first end wall of said electrical box.

17. The electrical box assembly of claim 16, further comprising
a second positioning tab coupled to said first side edge of said body and configured for folding outwardly to contact an outer front face of the building block.

18. The electrical box assembly of claim 13, further comprising
a positioning tab coupled to said first end of said leg by a fold line and configured to fold to a position to contact an inner surface of the hollow core building block.

19. The electrical box assembly of claim 18, further comprising
a positioning tab coupled to said second end of said leg by a fold line and configured to fold to a position to contact an inner surface of the hollow core building block.

20. The electrical box assembly of claim 19, wherein
said positioning tab at said first end of said leg is bendable from a first position extending toward said second end and a second position substantially perpendicular to said leg; and
said positioning tab at said second end of said leg is bendable from a first position extending toward said first end, and a second position substantially perpendicular to said leg.

* * * * *